United States Patent
Suehiro et al.

(10) Patent No.: US 9,079,363 B2
(45) Date of Patent: Jul. 14, 2015

(54) PROCESS FOR PRODUCING FILM CONTAINING ORIENTED NANOTUBES OR NANOPARTICLES, AND THE FILM

(75) Inventors: Junya Suehiro, Fukuoka (JP); Michihiko Nakano, Fukuoka (JP)

(73) Assignee: Kyushu University, National University Corporation, Fukuoka (JP)

( * ) Notice: Subject to any disclaimer, the term of this patent is extended or adjusted under 35 U.S.C. 154(b) by 0 days.

(21) Appl. No.: 13/821,421

(22) PCT Filed: Sep. 8, 2011

(86) PCT No.: PCT/JP2011/070506
§ 371 (c)(1),
(2), (4) Date: Mar. 7, 2013

(87) PCT Pub. No.: WO2012/033167
PCT Pub. Date: Mar. 15, 2012

(65) Prior Publication Data
US 2013/0171406 A1 Jul. 4, 2013

(30) Foreign Application Priority Data

Sep. 8, 2010 (JP) ................................. 2010-201186
Dec. 27, 2010 (JP) ................................. 2010-290755

(51) Int. Cl.
*B29C 70/14* (2006.01)
*B29D 7/01* (2006.01)
*B29C 70/62* (2006.01)
*B82Y 30/00* (2011.01)
(Continued)

(52) U.S. Cl.
CPC ................. *B29C 70/14* (2013.01); *B29C 70/62* (2013.01); *B29D 7/01* (2013.01); *B82Y 30/00* (2013.01); *B82Y 40/00* (2013.01); *C08J 5/18* (2013.01); *C01B 2202/08* (2013.01); *Y10T 428/24* (2015.01)

(58) Field of Classification Search
None
See application file for complete search history.

(56) References Cited

U.S. PATENT DOCUMENTS 6,004,499 A * 12/1999 Bishop et al. ................. 264/437

FOREIGN PATENT DOCUMENTS

| JP | 2003-301048 A | 10/2003 |
| JP | 2004-002119 A | 1/2004 |

(Continued)

OTHER PUBLICATIONS

2008274178A Translation, Nov. 13, 2008.*

(Continued)

*Primary Examiner* — Benjamin Schiffman
(74) *Attorney, Agent, or Firm* — Fay Sharpe LLP

(57) ABSTRACT

A method is disclosed for producing a film containing oriented nanotubes or nanoparticles. The nanotubes typified by CNTs or nanoparticles are oriented utilizing an electric field, and influence of an electrode is suppressed, thereby allowing for production of a large-area film containing nanotubes or nanoparticles including reliably oriented nanotubes or nanoparticles, at a low cost. The method for producing the film containing nanotubes or nanoparticles which are oriented along the plane direction of the film includes: placing a film precursor containing nanotubes or nanoparticles on an interdigitated comb-like electrode through a support, in which the comb-like electrode is arranged on an insulating plate and configured with electrode wires having a circular cross-section; applying an AC voltage to the comb-like electrode in a state with the film precursor present on the comb-like electrode; and converting the film precursor into a film.

7 Claims, 11 Drawing Sheets

(51) Int. Cl.
   *B82Y 40/00*   (2011.01)
   *C08J 5/18*    (2006.01)

(56)              References Cited

FOREIGN PATENT DOCUMENTS

| JP | 2004-323342 A | 11/2004 |
| JP | 2006-156389 A | 6/2006 |
| JP | 2008-274178 A | 11/2008 |
| JP | 2009-283303 A | 12/2009 |
| JP | 2010-027251 A | 2/2010 |
| JP | 2010-091844 A | 4/2010 |

OTHER PUBLICATIONS

Machine translation of JP 2009-283303 A, Dec. 3, 2009.*
Machine translation of JP 2010-27251 A, Feb. 4, 2010.*
International Search Report of International Application No. PCT/JP2011/070506 dated Dec. 13, 2011.

* cited by examiner

FIG.3
(a)
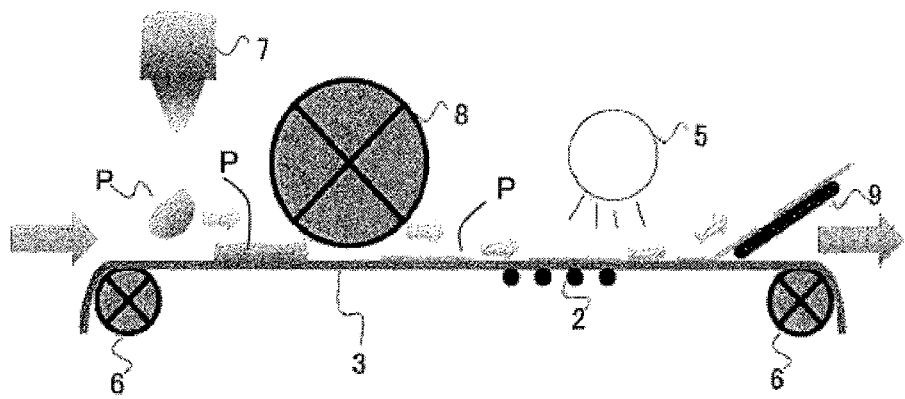
(b)
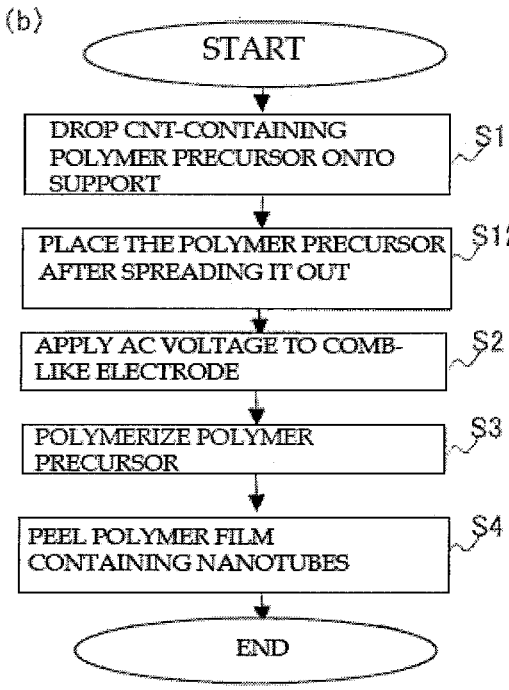

FIG.4
(a)
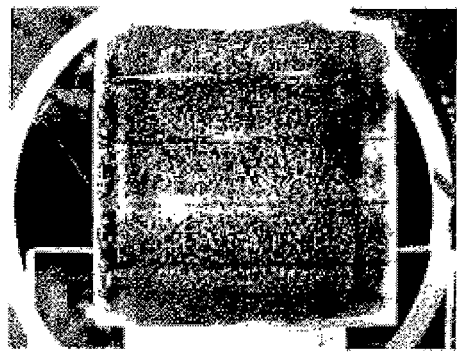
(b)
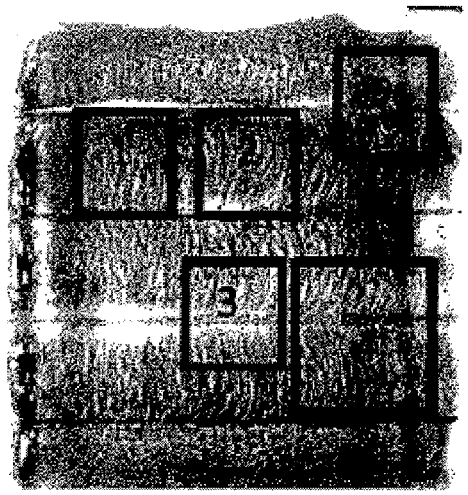
(c)
| Position Number | Resistivity ($\Omega$ m) |
|---:|---|
| 1 | $1.23 \times 10^6$ |
| 2 | $1.21 \times 10^6$ |
| 3 | $3.13 \times 10^6$ |
| 4 | $2.34 \times 10^6$ |
| 5 | $5.44 \times 10^6$ |

| | Sample 1 | Sample 2 | Average | Sample 3 | Sample 4 | Average |
|---|---|---|---|---|---|---|
| Resistivity Measurement Direction | Parallel to Electric Field (//) | | | Orthogonal to Electric Field (⊥) | | |
| With Oscillation | $2.98 \times 10^6$ | $9.10 \times 10^6$ | $6.04 \times 10^6$ | $2.33 \times 10^8$ | $1.29 \times 10^8$ | $1.81 \times 10^8$ |
| Without Oscillation | $4.66 \times 10^7$ | $6.99 \times 10^8$ | $3.27 \times 10^8$ | $4.71 \times 10^8$ | $9.54 \times 10^8$ | $7.13 \times 10^8$ |

($\Omega \cdot m$)

(b) 0.01wt%

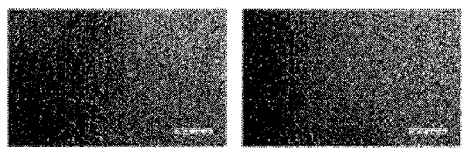

(c)

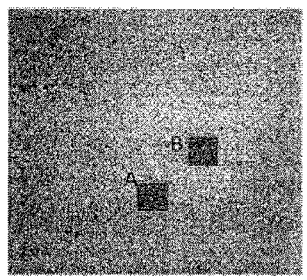

0.025wt%

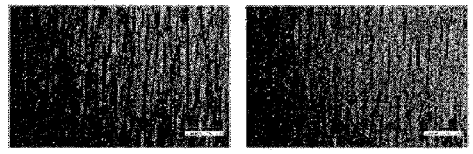

0.05wt%

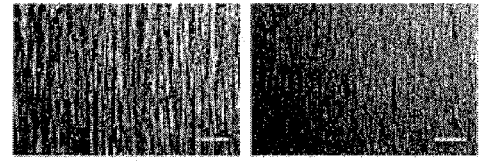

(d) A   B

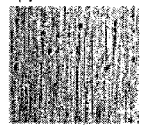
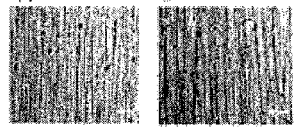

0.1wt%

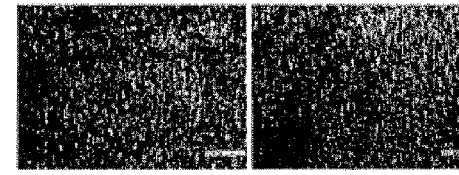

(e)

| | Resistivity ($\Omega \cdot m$) | |
|---|---|---|
| | Parallel to Orientation Direction | Orthogonal to Orientation Direction |
| A | $5.8 \times 10^5$ | $7.5 \times 10^7$ |
| B | $8.6 \times 10^5$ | $1.2 \times 10^8$ |

FIG.9
(a) 1rpm
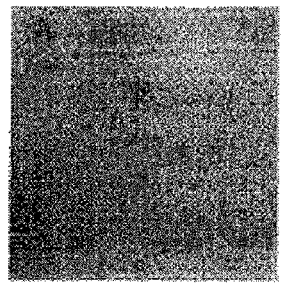
(b) 4rpm
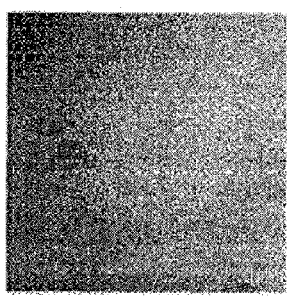
(c) 13rpm
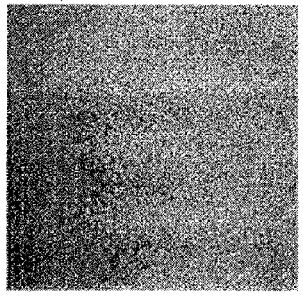
(d)
|  | Resistivity (Ω m) | |
| --- | --- | --- |
|  | Direction Parallel to Electric Field | Direction Orthogonal to Electric Field |
| Without Movement | $9.4 \times 10^7$ | $4.1 \times 10^8$ |
| 1 rpm | $4.4 \times 10^6$ | $5.9 \times 10^8$ |
| 4 rpm | $5.8 \times 10^5$ | $7.5 \times 10^7$ |
| 13 rpm | $1.0 \times 10^7$ | $1.9 \times 10^9$ |
| 30 rpm | $5.2 \times 10^7$ | $1.4 \times 10^9$ |

PROCESS FOR PRODUCING FILM CONTAINING ORIENTED NANOTUBES OR NANOPARTICLES, AND THE FILM

TECHNICAL FIELD

The present invention belongs to the field of nanotechnology, and specifically relates to a novel technique for producing a film, a so-called nanocomposite film, particularly one containing nanotubes typified by carbon nanotubes or nanoparticles oriented along a prescribed direction of the film.

BACKGROUND ART

Nanoscale substances are attracting attention for their various functions, and efforts are being made to develop novel nanoscale materials. For example, carbon nanotubes (Carbon Nanotube; CNT) have excellent properties in thermal conductivity, electrical conductance, mechanical strength and the like. Also, by incorporating CNTs with focus on their excellent properties, novel functional films utilizing the properties of CNTs are being actively researched. Examples of such functional films include nanocomposite films.

It is known that in a nanocomposite film containing nanotubes typified by CNTs or nanoparticles, particularly when CNTs are oriented in the film, the variation in film properties owing to the incorporation of the CNTs is remarkable, and electrical property (electric conductivity), mechanical property (elastic modulus) and thermal property (thermal conductivity) are increased compared to those when CNTs are simply mixed. In this regard, "oriented" means that each nanotube typified by a CNT has a diameter of nano meter order and a length of micro meter order, and the nanotubes analogous to one-dimensional substances are lined up in one direction. As for the orientation condition, the nanotubes lined up in one direction are desirably in contact with each other (to become networked).

Because of such excellent properties, nanocomposite films containing oriented nanotubes typified by CNTs or nanoparticles are used in a variety of applications, such as electromagnetic shields, heat dissipation films, transparent electrodes, and anti-static films.

As conventional methods for making CNTs oriented in a film, the following methods have been reported: a technique of producing an electric field between a pair of electrodes to orient the CNTs (e.g., see Japanese Laid-open Patent Publications No. 2004-323342 and No. 2010-027251: PTLs 1 and 2); a technique of applying an AC voltage between a pair of electrodes to produce a thin film consisting of only CNTs between the electrodes (e.g., see Japanese Laid-open Patent Publication No. 2010-091844: PTL 3); a technique for accumulating oriented CNTs onto a plurality of electrodes (e.g., see Japanese Laid-open Patent Publication No. 2006-156389: PTL 4); and a light-emitting element consisting of CNTs grown among a plurality of electrodes, and the electrodes (e.g., see Japanese Laid-open Patent Publication No. 2009-283303: PTL 5).

PRIOR ART DOCUMENTS

Patent Literatures

[PTL 1] Japanese Laid-open Patent Publication No. 2004-323342
[PTL 2] Japanese Laid-open Patent Publication No. 2010-027251
[PTL 3] Japanese Laid-open Patent Publication No. 2010-091844
[PTL 4] Japanese Laid-open Patent Publication No. 2006-156389
[PTL 5] Japanese Laid-open Patent Publication No. 2009-283303

SUMMARY OF THE INVENTION

Problems to be Solved by the Invention

However, when producing a functional film by a conventional method for orienting CNTs, it is difficult when using a pair of electrodes to expand the area of the film to be produced beyond a certain degree, for example, to a square meter order, and production has so far been limited to composite films of a width of a few centimeters at the most. This is because the orientability of CNTs depends on the electric-field intensity (simply, voltage per distance between electrodes), so that a large voltage, or a large-scale power source, is required to produce a wide film. Thus there is also an issue on the cost side. For example, in making CNTs oriented with an electric-field intensity of 1 kV/cm, a 10 kV power source is required for 10 cm width, and a 100 kV power source is required for 1 m width. Particularly, since a several kHz power source is required to efficiently perform orientation, the cost of providing such a high-voltage power source is considerable. And, since orientation of nanotubes typified by CNTs tends to be formed in the direction of an intense electric field, and an electric field becomes weaker with increasing distance from an electrode, the concentration of CNTs could increase near the electrode and decrease near the center of the film, whereby the CNTs may become inhomogeneous and lower in quality.

In addition, when a plurality of electrodes are used in a conventional method for orienting CNTs, since CNTs accumulate at a site where the electric field is intense, CNTs could aggregate near the edge of each electrode, whereby the CNT network could become disconnected. Moreover, none of these conventional technologies has a configuration in which CNTs are oriented particularly along the plane direction of the film, and, in any case, a great amount of carbon nanotubes must be incorporated.

The present invention was developed in order to solve the above problems, and an object of the present invention is to provide a new type of technique for producing a film containing nano tubes or nanoparticles which are oriented along the plane direction of the film; wherein the nanotubes typified by CNTs or nanoparticles are reliably oriented (particularly, along the plane direction of the film) utilizing an electric field, and influence of an electrode is suppressed, thereby allowing for production of a large-area film containing nano tubes or nanoparticles including nanotubes or nanoparticles, at a low cost.

Means for Solving the Problems

Through dedicated research, the present inventors newly found that nanotubes or nanoparticles can be reliably oriented (particularly, along the plane direction of the film) by orienting nanotubes typified by CNTs or nanoparticles oriented utilizing an electric field generated from an interdigitated comb-like electrode configured with electrode wires respectively having a circular cross-section thereby suppressing influence of the electrode; and a technique capable of producing the film containing nanotubes or nanoparticles, with an enlarged area, and at a low cost. Further, the inventors newly found a technique for producing a film containing nanotubes or nanoparticles, that is capable of producing the film containing nanotubes typified by CNTs or nanoparticles at a still lower cost and on a larger scale, by serializing the sequence of steps in the technique for producing the film containing nanotubes or nanoparticles in order to realize greater scale.

Thus, in accordance with the present invention, there is provided a method for producing a film containing nanotubes or nanoparticles; that is, a method for producing a film containing nanotubes or nanoparticles which are oriented along the plane direction of the film, which includes: a placing step of placing a film precursor containing nanotubes or nanoparticles on an interdigitated comb-like electrode through a support, in which the comb-like electrode is arranged on an insulating plate and configured with electrode wires having a circular cross-section; a voltage applying step of applying an AC voltage to the comb-like electrode in a state with the film precursor present on the comb-like electrode; and a film forming step of converting the film precursor into a film.

In accordance with the present invention, nanotubes or nanoparticles contained in a film precursor are oriented along the plane direction of the film in a voltage applying step; and the film precursor is converted into a film in a polymerizing step; whereby a film with a large area that contains nanotubes or nanoparticles which are oriented along the plane direction of the film can be obtained.

There is also provided a method for producing a film containing nanotubes or nanoparticles which are oriented along the plane direction of the film; wherein the voltage applying step includes an oscillating step of oscillating at least one or the other of the comb-like electrode and the support in a direction orthogonal to a longitudinal direction of the comb-like electrode. The electrode system is reciprocally translated by the oscillation, and the electric field affecting the nanotubes or nanoparticles is spatially averaged (electric field averaging); whereby the orientation property of the nanotubes or nanoparticles can be further enhanced.

There is also provided a method for producing a film containing nanotubes or nanoparticles which are oriented along the plane direction of the film; wherein the oscillating step includes: reciprocating the insulating plate or the support over a distance of 0.2 to 1 times the electrode-distance of the interdigitated comb-like electrode at intervals of 1 to 5 minutes per reciprocation. According to the oscillation condition, orientation of the nanotubes or nanoparticles is facilitated, whereby the orientation property of the nanotubes or nanoparticles can be further enhanced.

There is also provided a method for producing a film containing nanotubes or nanoparticles which are oriented along the plane direction of the film; wherein the placing step includes: adding a film precursor dropwise onto a support moving toward the comb-like electrode, and spreading the film precursor on the support to be placed on the comb-like electrode. The method further includes, after the film forming step, a peeling step of peeling the nanotube-containing film formed through the film forming step. This aspect is suited peculiarly for massively producing the film containing nanotubes or nanoparticles which are oriented along the plane direction of the film.

Further, in accordance with the above production method, there is also provided a film containing nanotubes or nanoparticles which are oriented along the plane direction of the film; wherein the nanotubes or nanoparticles are oriented along the plane direction of the film. The nanotubes or nanoparticles are oriented along the plane direction (particularly, in a direction of affected by the electric field) of the film, functions of nanotubes or nanoparticles, such as electric conductivity and thermal conductivity, can be significantly enhanced.

Furthermore, according to a production method of the present invention, there is also provided a film containing nanotubes or nanoparticles which are oriented along the plane direction of the film; wherein the nanotubes contained in the film generally have an orientation property of at least 0.2 in difference of local homogeneity (local homogeneity) between the orientation direction and the perpendicular direction, based on texture analysis by the spatial gray level dependence method (SGLDM). As described above, since the film has nanotubes or nanoparticles with high orientation property, an intended function can be achieved by a smaller amount of nanotubes or nanoparticles than conventionally, and the production cost can therefore be reduced. And, since nanotubes or nanoparticles of less than the conventional amount are sufficient for producing the film, transparency (degree of clearness) of the film can be also enhanced.

Still further, according to a production method of the present invention, there is also provided a film containing nanotubes or nanoparticles which are oriented along the plane direction of the film; wherein a nanocomposite film containing nanotubes or nanoparticles generally has an electric resistivity of $5.0 \times 10^5$ to $1.0 \times 10^{10}$ ($\Omega \cdot$m). As described above, since the film which can be obtained according to the present invention is lower in electric resistivity than conventional films, a useful film as a conductive film can be provided.

Furthermore, in accordance with the present invention, there is also provided a device for producing a film containing nanotubes or nanoparticle; that is, a device for producing a film containing nanotubes or nanoparticles which are oriented along the plane direction of the film, which includes: an insulating plate consisting of an insulator; an interdigitated comb-like electrode which is arranged in a comb-like shape on the insulating plate, and is configured with a plurality of electrode wires respectively having a circular cross-section that are connected to a high-voltage and ground in an alternating arrangement; a support which is placed on the upper surface of the insulating plate being in contact with the comb-like electrode, to place a film precursor containing nanotubes or nanoparticles thereon; an AC power source for applying an AC voltage to the comb-like electrode in a state with the film precursor present on the support being in contact with the comb-like electrode; and a film forming unit for converting the film precursor into a film to form the nanotube-or-nanoparticles-containing film.

Additionally, in a device for producing a film of the present invention, there is also provided, according to need, a device for producing a film containing nanotubes or nanoparticles which are oriented along the plane direction of the film, which includes: an oscillating unit for moving at least one or the other of the insulating plate and the support in a direction perpendicular to a longitudinal direction of the comb-like electrode. The oscillating enhances the orientation property of the nanotubes or nanoparticles.

Moreover, in a device for producing a film of the present invention, there is also provided, according to need, a device for producing a film containing nanotubes or nanoparticles which are oriented along the plane direction of the film, which includes: a conveying unit for progressively moving a support, which has a belt-like shape in contact with the interdigitated comb-like electrode, in a specific direction toward the comb-like electrode; a dropping unit for dropping the film precursor onto the support; a spreading unit for spreading the dropped film precursor; and a peeling unit for progressively peeling the film containing nanotubes or nanoparticles formed by the polymerizing unit from the support; wherein the AC power source applies an AC voltage to the comb-like electrode when the spread out film precursor is moved onto the comb-like electrode by the conveying unit. This aspect is suited especially for massively producing the film containing nanotubes or nanoparticles which are oriented along the plane direction of the film.

BRIEF DESCRIPTION OF THE DRAWINGS

FIG. 3 exemplarily shows a schematic diagram and a flow-chart of a device using a belt-like support that can be used in a method for producing a polymer film containing oriented nanotubes or nanoparticles according to the present invention.

FIG. 4 shows results of an experiment on a CNT nanocomposite film oriented along the plane direction of the film, which was produced in accordance with a production method of the present invention.

FIG. 7 shows results of an experiment in which a CNT nanocomposite film oriented along the plane direction of the film was produced in different ways, with and without an oscillating operation; and microscopic images taken with an optical microscope of an oriented CNT nanocomposite film with respect to each concentration of the obtained CNT, in accordance with a production method of the present invention.

FIG. 9 shows results of an experiment on a CNT nanocomposite film oriented along the plane direction of the film produced in accordance with a production method of the present invention, where the film was produced with varied oscillation speed.

BEST MODE FOR CARRYING OUT THE INVENTION

Figure 1:
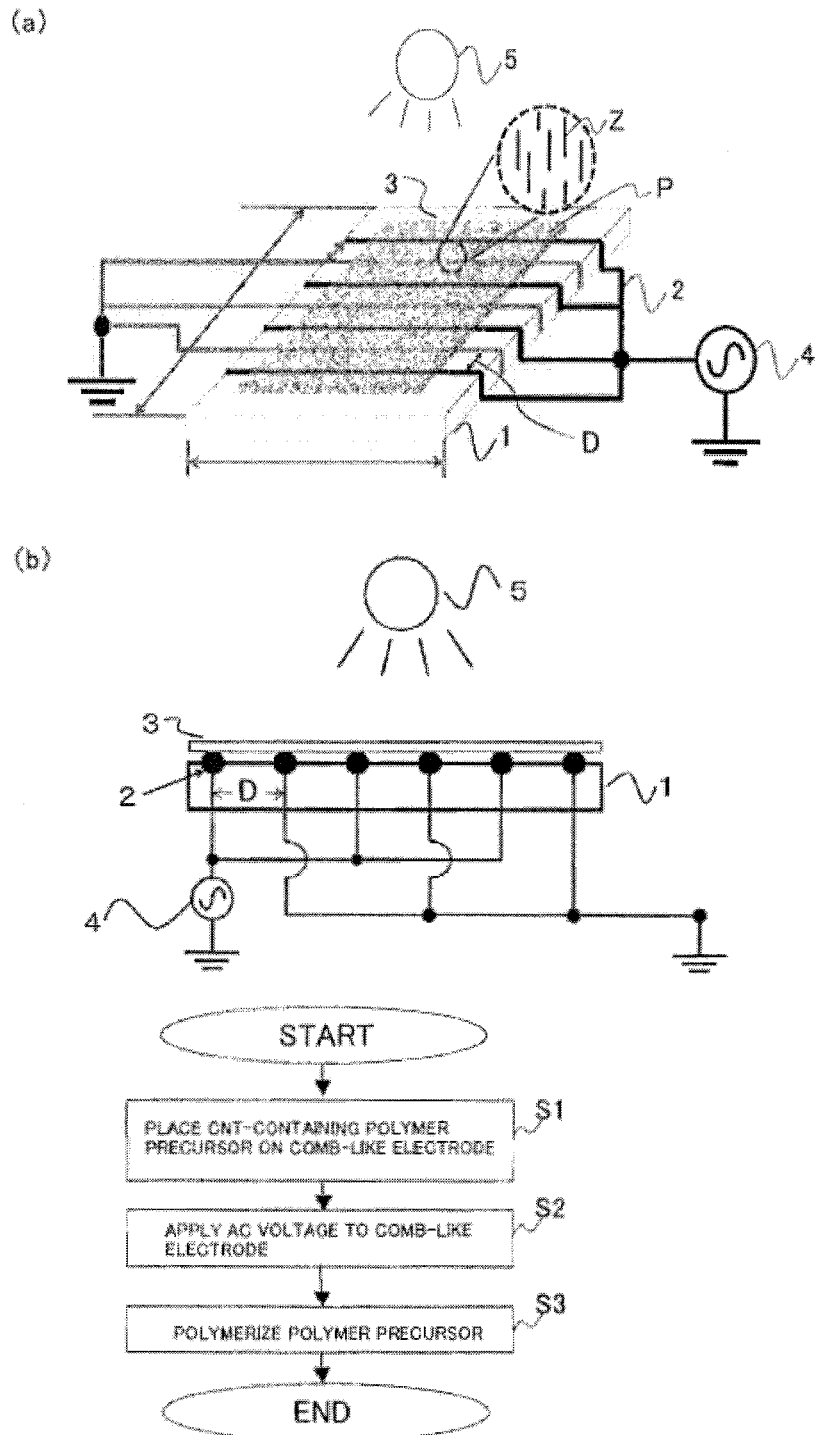
FIG. 1 exemplarily shows schematic diagrams and a flow-chart of a device that can be used in a method for producing a polymer film containing oriented nanotubes or nanoparticles according to the present invention.

A polymer film constituted as a film containing nanotubes typified by CNTs or nanoparticles of the present invention (e.g., a CNT nanocomposite film) is produced by applying an AC voltage to an interdigitated comb-like electrode on whose upper portion is placed a polymer precursor as a film precursor containing nanotubes or nanoparticles, and then polymerizing the polymer precursor. The obtained polymer film containing nanotubes or nanoparticles can be checked by observation with a microscope such as an optical microscope and a transmission electron microscope (see Examples described below).

The size of a nanotube or nanoparticle to be used in the present invention is not particularly limited as long as the size is within the general concept of nanoscale. A nanotube or nanoparticle is commonly defined as a substance having a length of nanometer order in either dimensional direction, that is preferably no more than 1000 nm, and particularly preferably 1 to 100 nm. The shape is also not particularly limited, and may also be, for example, one other than cylindrical or spherical.

As for a nanotube or nanoparticle to be used in the present invention, various types of nanotubes or nanoparticles having a size within the aforesaid ranges may be used.

For example, the nanotube or nanoparticle may be selected from among: a noble metal-based nanotube or nanoparticle composed at least one of gold (Au), silver (Ag), platinum (Pt), palladium (Pd), rhodium (Rh), and iridium (Ir); a sulfide-based nanotube or nanoparticle composed at least one of boron nitride (BN), gallium nitride (GaN), boron carbonitride (BCN), zinc selenide (ZnSe), molybdenum disulfide ($MoS_2$), and tungsten disulfide ($WS_2$); an oxide-based nanotube or nanoparticle composed at least one of vanadium pentoxide ($V_2O_5$), silica dioxide ($SiO_2$), titanium dioxide ($TiO_2$), and aluminum oxide ($Al_2O_3$); a carbon nanotube or nanoparticle composed of carbon atoms (C); and a rod-like substance, i.e. a metal nanowire, of zinc oxide (ZnO), tin (Sn), silicon (Si), zinc (Zn), cadmium (Cd) or the like, or a nanoparticle thereof.

Among the above, a carbon nano tube having an excellent properties in thermal conductivity, electric conductivity, mechanical strength and the like is preferably used in the present invention. As is well known, types of CNT include a single-walled carbon nanotube (Single-Walled Carbon Nanotube; SWCNT), and a multi-walled carbon nanotube (Multi-Walled Carbon Nanotube; MWCNT), and the present invention can be applied to both types of CNTs. Specifically, types of CNT by structure include an armchair (armchair) type, a zigzag type, and a chiral type based on the geometry of the interatomic bonds; and further include a CNT assuming metallic property (electric conductivity), and a CNT assuming semiconductivity, by the phase transition between the metallic phase and the semiconducting phase, based on the diameter and the chiral angle of the CNT, and the present invention can be also applied to every CNT of the above types similarly. Further, among such CNTs, a MWCT is particularly preferable in the point that electric conductivity and thermal conductivity can be easily obtained therein. Since every CNT described above is commercially available, in a variety of structural types, the above CNTs can be used in the present invention, in accordance with the intended purpose.

As a film precursor containing nanotubes or nanoparticles to be used in the present invention, a polymer precursor or a sol may be used, and films composed of a polymer or a gel respectively can be obtained, while nanotubes or nanoparticles are contained in the film.

In the polymer precursor, normally, a polymerization initiator required for polymerization, various types of additive agents and the like are dissolved in a suitable solvent in addition to the polymer precursor (i.e., a monomer or oligomer of the polymer). Examples of the polymer film formed by polymerization of the polymer precursor include: a photocuring resin such as an ultraviolet curing resin and a visible light curing resin; and a thermosetting resin such as a phenolic resin (PF), a urea resin (UF), a melamine resin (MF), an unsaturated polyester resin (UP), an epoxy resin (EP), and a diallyl phthalate resin (PDAP or DAP). Among the above, the polymer film is preferably a light curing resin, and thereamong, particularly preferably a thermosetting resin.

Since ultraviolet curing resins start polymerization only when being irradiated with ultraviolet region light, ultraviolet curing resins have preservation stability before polymerization, and are easy to be handled. Further, since a polymerization initiator is also contained therein and is not required to be separately added thereto, there is an advantage of high convenience. The present invention uses a polymer which is formed by nanotubes typified by CNTs or nanoparticles being mixed with such a polymer precursor by stirring with the use of an ultrasonic homogenizer or the like, and then returning the temperature to a room temperature. The above polymer may be a conductive polymer or may be an insulating polymer, as to be described below.

A sol-gel method can be applied to a sol to produce a gel including a glasslike film. Among the above, the sol is preferably formed by metal alkoxide being hydrolyzed and being condensation-polymerized thereafter; and thereamong, particularly preferably formed by tetraethoxysilane that is hydrolyzed and then condensation-polymerizaed.

As an interdigitated comb-like electrode to be used in the present invention, an electrode wire having a circular cross-section may be used, and the material thereof is not particularly limited. For example, tungsten or platinum may be used. In accordance with the present invention, an AC voltage is applied to the comb-like electrode; and the AC voltage per centimeter (cm) of the electrode-distance in the comb-like electrode is preferably 1 kV to 6 kV, and particularly preferably 4 kV. The AC voltage is preferably applied at a frequency of 1 kHz to 28 kHz, and particularly preferably at a frequency of 4 kHz. When the frequency is lower than the aforesaid frequency, the resistance value of the polymer film becomes high; and when the frequency is higher than the aforesaid frequency, the resistance value of the polymer film becomes high and the cost of the power source required to output the high frequency becomes considerable.

As is understood from the methods described above, the film containing nanotubes (particularly, CNTs) or nanoparticles to be produced in accordance with the present invention specifically contains nanotubes (particularly, CNTs) or nanoparticles which are oriented along the plane direction of the film by an electric field generated on the upper surface of the comb-like electrode configured with electrode wires respectively having a circular cross-section.

Further, in a film containing nanotubes (particularly, CNTs) or nanoparticles which are oriented between electrodes using conventionally a pair of or a plurality of pairs of parallel plate electrodes, an intense electric field is biased toward the neighborhood of the electrodes; therefore unevenness is caused in orientation of the nano tubes (particularly, CNTs) or nanoparticles, or the orientation property of the nanotubes (particularly, CNTs) or nanoparticles is lowered near the electrodes located at the boundary with the film. Contrastingly, in the present invention, nanotubes typified by CNTs or nanoparticles are oriented by an electric field generated on the upper surface of the comb-like electrode configured with electrode wires respectively having a circular cross-section; therefore the nano tubes or nanoparticles are homogeneously oriented with the influence of the distance from the electrode being suppressed, and whereby a novel film containing the nanotubes typified by CNTs or nanoparticles which are reliably oriented along the plane direction of the film can be obtained.

Furthermore, at least one or the other of the comb-like electrode and the support is oscillated in a direction orthogonal to a longitudinal direction of the comb-like electrode, whereby a film in which nanotubes or nanoparticles are homogeneously and reliably oriented along the plane direction (particularly, in a direction affected by the electric field) of the film can be obtained.

Still further, as is understood from the method described above, by the use of the comb-like electrode configured with electrode wires respectively having a circular cross-section; wherein nanotubes typified by CNTs or nanoparticles are orientated without being affected by the position of the electrode, and the voltage is uniformly applied regardless of the area of the film containing the nano tubes or nanoparticles, a novel film with a nonconventional large area that contains nanotubes or nanoparticles can be obtained at a low cost.

As described above, the film containing the nanotubes or nanoparticles to be obtained according to a production method of the present invention can be used as, for example, an electromagnetic shield and an anti-static film. Such an electromagnetic shield and anti-static film are larger in area than that of conventional films, and the nanotubes (particularly, CNTs) or nanoparticles are reliably oriented, thereby allowing for use as novel materials excellent in conductivity and capable of covering a wide area with a single film.

The polymer film produced in accordance with the above description can fulfill functions suited to various uses by adjusting the mixed quantity of the types of polymers and nano tubes or nanoparticles.

By the adjustment of the mixed quantity of the nanotubes or nanoparticles, a macromolecular material (e.g., a conductive polymer film) having high electric conductivity can be produced. The conductive polymer film can be formed by the use of, for example, an acrylic resin (PMMA) or a silicone-based resin, in the polymer precursor. Further, the conductive polymer film can be also formed by the use of a conductive macromolecule, such as polyacetylene, polyaniline, and polythiophene, essentially having a low resistivity compared to other macromolecular materials, in the polymer precursor. In the polymer film to be produced by incorporating CNTs or nanoparticles in these polymer precursors in accordance with the present invention, high orientation property can be obtained; therefore a material having lower electric resistivity than that of conventional materials can be obtained. The conductive polymer film to be produced in accordance with the present invention can be utilized as, for example, a touch panel that is larger in area and smaller in power consumption than those of conventional films.

Also, by the adjustment of the mixed quantity of nanotubes or nanoparticles, a macromolecular material (e.g., an insulating polymer film) having high heat dissipation property while maintaining the insulation property can be produced. The insulating polymer film can be formed by the use of polystyrene, a silicone-based resin, or polyimide in the polymer precursor. Particularly, by incorporating nanotubes or nanoparticles in accordance with the present invention, high orientation property can be obtained; therefore a material having higher thermal conductivity than that of conventional materials can be obtained. Since conventional heat dissipation films provided in electric transmission equipment or high-voltage equipment are insufficient in heat exchange, there has been a problem that the equipment could be melted by the high voltage and high current. Contrastingly, the insulating polymer of the present invention has high heat durability, so that the problem of melting can be mitigated. In addition, the insulating polymer of the present invention exhibiting high heat dissipation property can be utilized as a heat dissipation material of computers, which are becoming microminiaturized, and electric vehicles.

Figure 2:
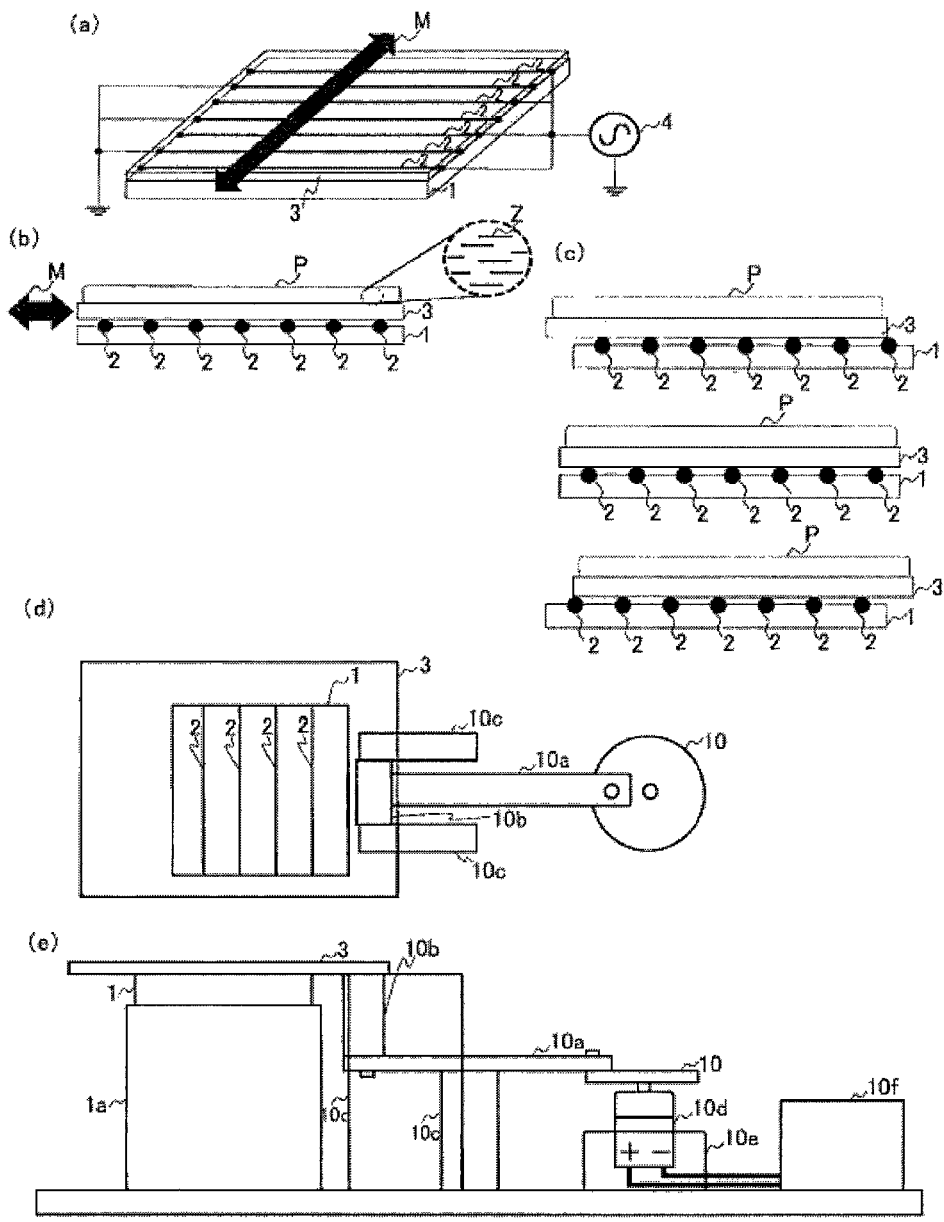
FIG. 2 shows explanatory diagrams illustrating an oscillating operation of a device that can be used in a method for producing a polymer film containing nanotubes or nanoparticles according to the present invention.

In accordance with the above-described methods, a configuration of a production device for producing a film containing nanotubes or nanoparticles is described below with reference to FIG. 1 to FIG. 3. The figures illustrate the case where the film is composed as a polymer, and the nanotube or nanoparticle is a CNT, as a particularly preferred aspect of the present invention. FIG. 1 exemplarily shows schematic diagrams and a flowchart of a device that can be used in a method for producing a polymer film containing oriented nanotubes or nanoparticles according to the present invention; FIG. 2 shows explanatory diagrams illustrating an oscillating operation of a device that can be used in a method for producing a polymer film containing nanotubes or nanoparticles according to the present invention; and FIG. 3 exemplarily shows a schematic diagram and a flowchart of a device using a belt-like support that can be used in a method for producing a polymer film containing oriented nanotubes or nanoparticles according to the present invention.

As shown in FIGS. 1(a) and (b), a device for producing a polymer film containing nanotubes or nanoparticles according to the present invention includes: a flat-plate like insulating plate 1 consisting of an insulator; an interdigitated comb-like electrode 2 which is arranged in a comb-like shape, and is configured with a plurality of electrode wires respectively having a circular cross-section that are connected to a high-voltage and a ground in an alternating arrangement; a support 3 which is placed on the upper surface of the insulating plate to be in contact with the comb-like electrode and adapted to have a CNT-containing polymer precursor P containing nanotubes placed thereon; an AC power source 4 for applying an AC voltage to the comb-like electrode in a state with the CNT-containing polymer precursor P present on the support in contact with the comb-like electrode; and a polymerizing unit 5 for polymerizing the CNT-containing polymer precursor P to form a polymer film containing nanotubes.

The material of the insulating plate 1 is not particularly limited so long as it is an insulating flat plate, and for example, an acrylic plate may be used. An electrode wire having a circular cross-section is used in the comb-like electrode 2, where the material thereof is not particularly limited so long as it is an electrically conductive substance, and for example, tungsten or platinum may be used. The material of the support 3 is not particularly limited so long as it has a film shape, and preferably has a relative dielectric constant of 4 or less, and more preferably is an insulating film, where the polymer film more desirably has high detachability, and for example, Parafilm may be used. An AC power source 4 is a power source for applying an AC voltage. A polymerizing unit 5 is for polymerizing a polymer precursor containing nanotubes; for example, an ultraviolet irradiating device when the polymer film is composed of an ultraviolet curing resin, or a heating device when the polymer film is composed of a thermosetting resin.

A method for producing a polymer film containing nanotubes or nanoparticles of the present invention according to the above configuration is explained below in conjunction with FIG. 1(c). First, the CNT-containing polymer precursor P in which CNTs and a polymer precursor are mixed, is placed on the support 3 in contact with the comb-like electrode 2 (S1). In this regard, since the cross-section of an electrode wire in the comb-like electrode 2 is a circular shape, the support 3 may be mounted in a state of being in contact with the comb-like electrode 2. Next, an AC voltage is applied from the AC power source 4 to the comb-like electrode 2 (S2). The frequency is preferably 1 kHz to 28 kHz. The AC power source 4 preferably applies an AC voltage of 1 kV to 6 kV per centimeter of the electrode-distance in the comb-like electrode 2, and applies more preferably an AC voltage of 4 kV. As shown in FIG. 1(a), the application of the AC voltage orients the carbon nanotubes Z contained in the CNT-containing polymer precursor P oriented. Then, after the application of the AC voltage, the CNT-containing polymer precursor P is polymerized (S3). By the polymerization, a polymer film containing the orientated carbon nanotubes Z can be obtained. Or, when a sol is used as the film precursor, the sol is dried in the film forming step, and consequently a gel film containing the orientated carbon nanotubes Z can obtained.

When applying the AC voltage in S2, at least one or the other of the insulating plate 1 and the support 3 may be oscillated in a direction perpendicular to a longitudinal direction of the comb-like electrode 2. The oscillation can be performed by the use of an oscillating unit for reciprocally moving at least one or the other of the insulating plate 1 and the support 3 along the oscillating direction M shown in FIGS. 2(a) and (b).

As shown in FIG. 2(c), the oscillating unit moves at least one or the other of the insulating plate 1 and the support 3 at constant time intervals, whereby the AC voltage from the comb-like electrode 2 is evenly applied all over the CNT-containing polymer precursor P, the orientation property of nanotubes or nanoparticles can be further enhanced.

The oscillating unit preferably reciprocates the insulating plate 1 or the support 3 over a distance of 0.2 to 1 times the electrode-distance of the comb-like electrode (D: the distance between adjacent positive and negative poles) at intervals of 1 to 5 minutes per reciprocation. By the oscillation under this oscillation condition, orientation of the nanotubes or nanoparticles is facilitated, thus the orientation property of the nanotubes or nanoparticles can be further enhanced.

Regarding the oscillating unit of the device for producing a polymer film, FIG. 2(d) shows a top view, and FIG. 2(e) shows a side view. The oscillating unit includes: a crank disc 10 for performing rotating movement; a connecting rod 10a for converting the rotating movement of the crank disc 10 into reciprocating movement; a slider 10b for transmitting motion of the connecting rod 10a to the insulating plate 1; a supporting portion 10c for supporting the motion of the connecting rod 10a; a motor 10d for transmitting a rotating motion to the crank disc 10; a motor base 10e for supporting the motor 10d; and a DC power source 10f as a source of motive power of the motor 10d. An insulating plate supporting portion 1a supports the insulating plate 1.

As described above, the crank disc 10 is driven to perform the rotating movement by the motive power of the motor 10d, and the connecting rod 10a converts the rotating movement into the reciprocating movement, thereby allowing the insulating plate 1 to perform the reciprocating movement.

In the present invention, since the comb-like electrode 2 configured with electrode wires respectively having a circular cross-section and the CNT-containing polymer precursor P are arranged so as not to come into direct contact with each other through the support 3, which is placed on the comb-like electrode 2 in contact therewith, CNTs are not accumulated at the CNT-containing polymer precursor P on the comb-like electrode 2, whereby cleaning of the comb-like electrode 2 becomes unnecessary, and thus an even flatter polymer film can be easily produced.

Further, the device for producing a polymer film containing nanotubes or nanoparticles of the present invention may be a device using a belt conveyor, as a modified embodiment of the above. A configuration of the production device is described below based on differences from the above-described configuration, with reference to FIG. 3(a). It is noted that the same components as those in the above-described configuration are indicated with the same reference numerals respectively.

The device for producing a polymer film containing nanotubes or nanoparticles according to the present invention, includes: a conveying unit 6 for progressively moving a support 3, which has a belt-like shape in contact with the comb-like electrode 2, in a specific direction toward the comb-like electrode 2; a dropping unit 7 for dropping the CNT-containing polymer precursor P onto the support 3; a spreading unit 8 for spreading the dropped CNT-containing polymer precursor P; and a peeling unit 9 for progressively peeling the polymer film containing nanotubes formed by the polymerizing unit 5 from the support 3.

The conveying unit 6 is configured to wind the belt-like support 3 therearound to endlessly move the support, and may be configured as, for example, a belt conveyor device. The dropping unit 7 drops the CNT-containing polymer precursor P, in which CNTs and a polymer precursor are mixed by stirring or the like in advance, onto the support 3. The spreading unit 8 may be configured as a pressing rotor to spread out the dropped CNT-containing polymer precursor P by physical pressure. The peeling unit 9 progressively peels the polymer film containing nanotubes formed by the polymerizing unit 5 from the support 3.

A method for producing a polymer film containing nanotubes of the present invention according to the above configuration is described below with reference to FIG. 3(b). First, the CNT-containing polymer precursor P is dropped onto the support 3 which is progressively moved in a specific direction toward the comb-like electrode 2 (S11). Next, the dropped CNT-containing polymer precursor P is spread out to be placed on the comb-like electrode 2 (S12). And then, the previously described S2 and S3 are performed similarly to the above, and the polymer precursor P containing CNTs which are oriented along the plane direction of the film is polymerized to produce a CNT nanocomposite film. The polymerized CNT nanocomposite film is progressively peeled by the peeling unit 9 (S4).

As described above, the support 3 is automated to form a belt structure as a belt conveyor, thereby allowing the polymer film containing nanotubes or nanoparticles to be uplifted in scale, and to be produced efficiently. Additionally, in the present invention, according to the electrode configuration of the comb-like electrode, the AC voltage applied through the comb-like electrode is constant even when the film is enlarged in area, thus the CNT nanocomposite film can be produced at a lower cost, by the use of the belt conveyor device of the present configuration.

It is noted that, although aspects where the nanotubes or nanoparticles are CNTs have been described so far, the present invention is not limited to the CNTs or carbon nanoparticles, and the polymer film containing nanotubes or nanoparticles can be similarly produced also with other inorganic nanotubes or nanoparticles.

EXAMPLES

The following Examples are presented to illustrate the features of the present invention more specifically with reference to FIG. 4 to FIG. 11. However, the present invention is not limited to the Examples.

Example 1

Electrode wires (tungsten, 0.06 mmϕ) were arranged at 1 cm intervals on an acrylic plate (5 cm square) to prepare an electrode plate. An ultraviolet curing resin (A-1669; TESK) was used for the polymer film. The respective electrode wires were alternately connected to a power source and a ground. An upper portion of each of the electrode wires was covered with a Parafilm (registered trademark, manufactured by Pechiney Plastic Packaging Inc.). The ultraviolet curing resin of 0.05 wt % CNT content was spread out on an upper portion of the electrode plate, as a polymer mixed with CNTs (multi-walled carbon nanotubes) (manufactured by Sigma-Aldrich Co. LLC.). The ultraviolet curing resin had been stirred using an ultrasonic homogenizer (manufactured by SMT Co., Ltd.) for 6 hours to mix with the CNTs. A voltage was applied, and concurrently polymerization of the polymer started. Application of the voltage was carried out for 20 minutes, and at 10 minutes after the voltage application, ultraviolet irradiation was carried out for 30 minutes. As a power source, a 20/20C (TREK Inc.) was used to apply an AC voltage of 4 kV per centimeter (cm) of the electrode-distance, at a frequency of below 5 kHz. And an inverter-type neon transformer (LECIP Holdings Corp.) connected with an autotransformer Slidac (registered trademark) of 50 Hz for the primary voltage was used to apply an AC voltage of 4 kV per cm of the electrode-distance, at a frequency of 28 kHz. FIGS. 4(a) and (b) show optical microscope images of an obtained CNT nanocomposite film.

As shown in FIGS. 4(b) and (c), location-dependent resistivity was checked (the respective position numbers in the two figures correspond to each other). From the results of the above, it was ascertained that the CNT nanocomposite film in which CNTs were homogeneously and reliably oriented along the plane direction of the film was produced with no difference in the level of CNT orientation even near the comb-like electrode. From the photographs showing the CNT orientation and the measurement results of the resistivity, it is considered that an efficient network was formed in the CNT nanocomposite film produced in accordance with the present invention.

Example 2

Measurement when the Frequency of the Applied Voltage was Changed

Figure 5:
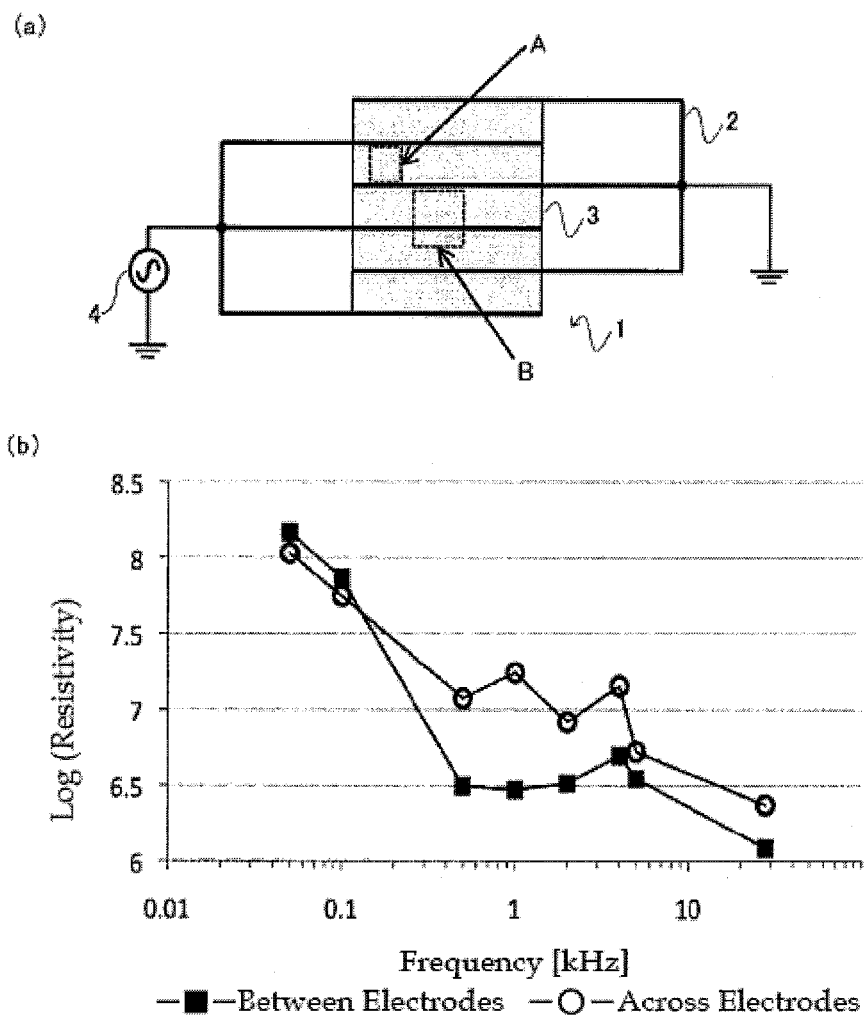
FIG. 5 shows results of an experiment in which a CNT nanocomposite film oriented along the plane direction of the film was produced with varied AC frequency.

In the same device configuration as in Example 1, with the use of a 20/20C (TREK Inc.) as a power source, CNT nanocomposite films were produced with the frequency of the applied voltage being changed to 50 Hz, 100 Hz, 500 Hz, 1 kHz, 2 kHz, 4 kHz, and 5 kHz. The magnitude of the voltage applied was set to 4 kV per centimeter (cm) of the electrode-distance at 50 Hz to 4 kHz, and to 3.8 kV at 5 kHz. FIG. 5 shows results of an experiment in which the respective CNT nanocomposite films were produced at varying AC frequency. As shown in FIG. 5(a), a 1 cm square cut-piece A for resistance measurement taken from between electrode wires, and a 1.5 cm square cut-piece B for resistance measurement taken from across electrode wires were cut from the obtained CNT nanocomposite film. The resistivity in a direction parallel to an applied electric field was measured on the cut out cut-pieces A and B. FIG. 5(b) shows obtained results. FIG. 5(b) also includes results (28 kHz) obtained from Example 1.

As is apparent from FIG. 5(b), the resistivity of both the cut-piece A taken from between electrode wires and the cut-piece B taken from across electrode wires sharply decreased at near 1 kHz, and then significantly decreased in the range of 1 kHz to 28 kHz. The difference in resistivity between the cut-piece A taken from between electrode wires and the cut-piece B taken from across electrode wires diminished as the frequency increased from 1 kHz to 4 kHz, the two values became equal at near 4 kHz, and the difference widened again as the frequency increased from 4 kHz to 28 kHz. From the results, it was found that 4 kHz is the optimum frequency condition where low resistivity can be achieved, and homogeneous CNT orientation can be achieved regardless of the position on the electrode wires.

In this regard, when a frequency higher than 28 kHz is applied by an AC power source, the resistance value of the polymer film becomes high, and the cost of the power source for outputting the high frequency is considerable, so that an AC voltage in the range of 1 kV to 28 kV is preferably applied.

Example 3

Measurement when the Applied Voltage was Changed

Figure 6:
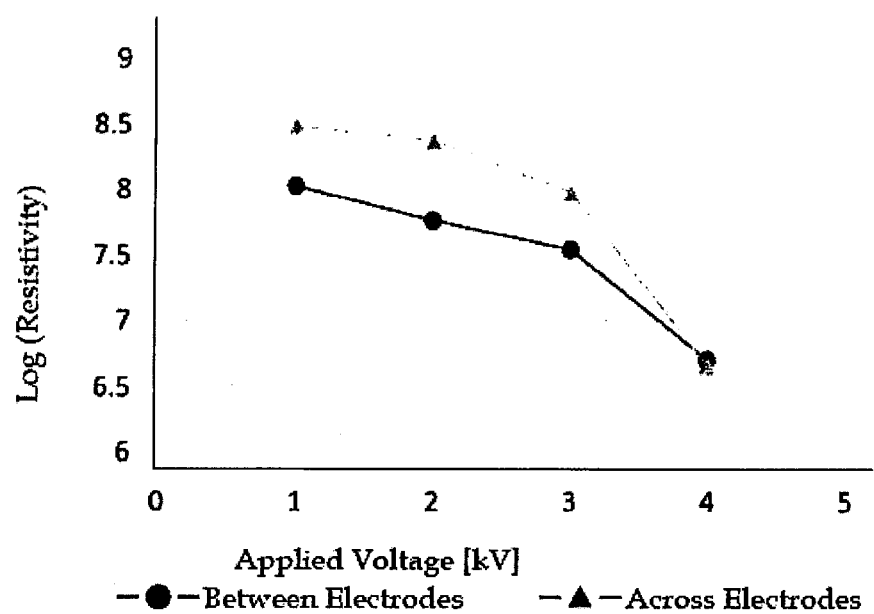
FIG. 6 shows results of an experiment in which a CNT nanocomposite film oriented along the plane direction of the film was produced with varied AC voltage.
Figure 8:
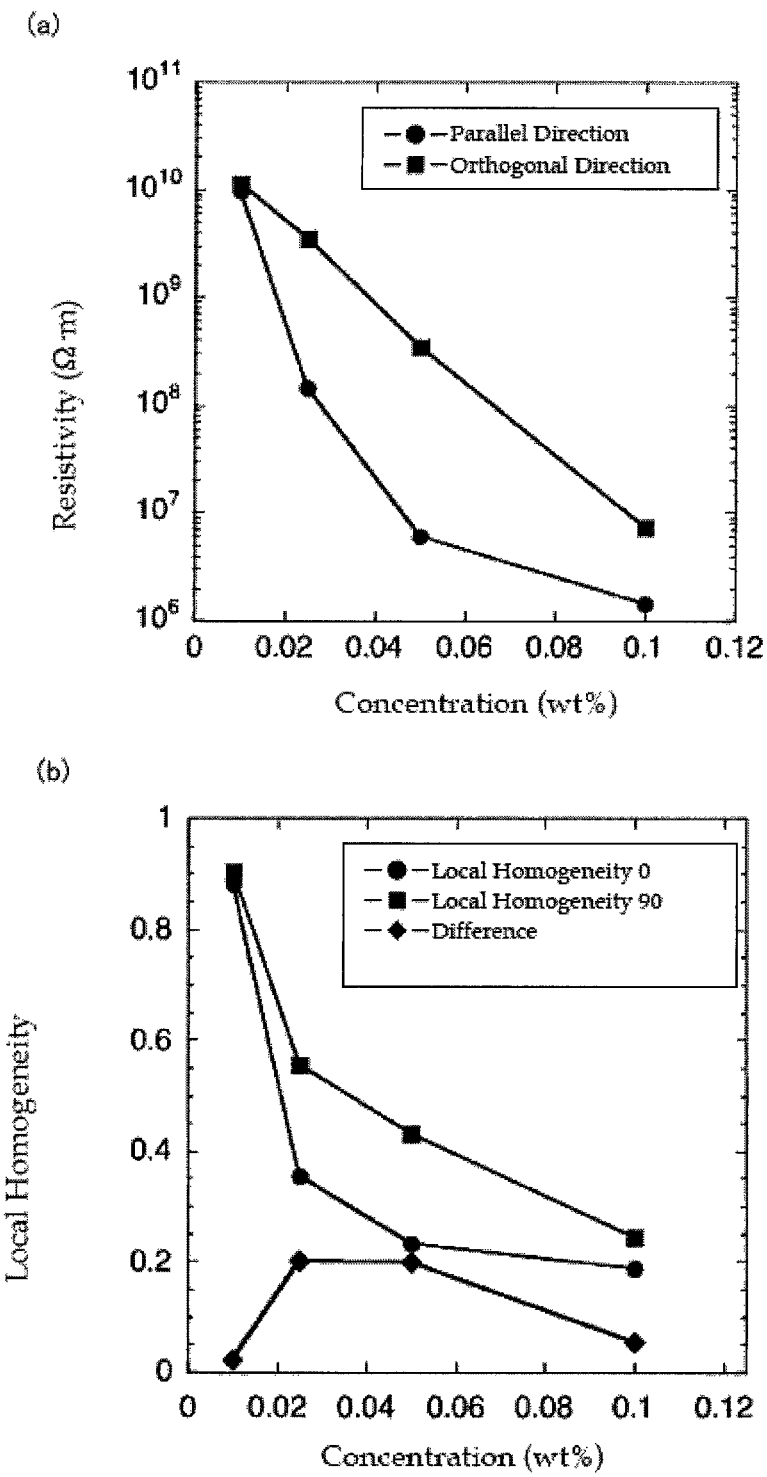
FIG. 8 shows results of an experiment that indicate the resistivity and local homogeneity corresponding to each concentration of a CNT nanocomposite film oriented along the plane direction of the film produced in accordance with a production method of the present invention.
Figure 10:
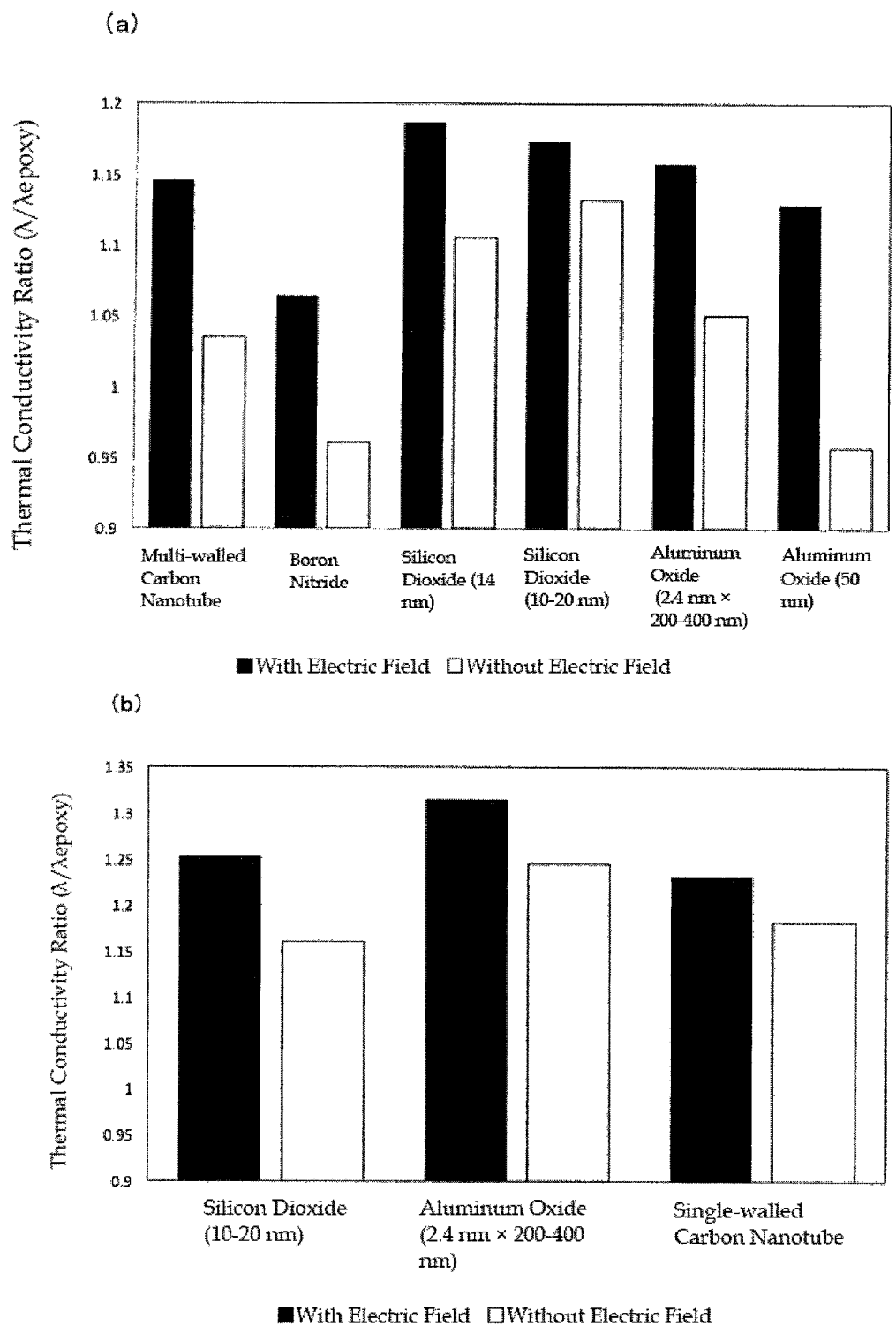
FIG. 10 shows results of measurements on the thermal conductivity of nanotubes and nanoparticles produced in accordance with a production method of the present invention.

In the same device configuration as in Example 2, CNT nanocomposite films were produced with the applied voltage being changed to 1 kV, 2 kV, 3 kV, and 4 kV per centimeter (cm) of the electrode-distance. The frequency of the applied voltage was set to 4 kHz. Similarly to Example 2, as shown in FIG. 5(a), a cut-piece A taken from between electrode wires, and a cut-piece B taken from across electrode wires were cut out from an obtained CNT nanocomposite film to carry out measurement of the resistivity in a direction parallel to an electric field. FIG. 6 shows results of an experiment in which the respective oriented CNT nanocomposite films were produced at varying AC voltage.

As shown in FIG. 6, the resistivity significantly decreased as the applied voltage increased in the range of 1 kV to 4 kV, and the resistivity sharply lowered particularly at near 4 kV. Further, the difference in resistivity between the cut-piece A taken from between electrodes and the cut-piece B taken from across electrodes diminished as the applied AC voltage increased from 1 kV to 4 kV, and the two values became equal at near 4 kV. From the results, it was found that 4 kV AC voltage is the optimum applied voltage condition where low resistivity can be achieved, and also homogeneous CNT orientation can be achieved regardless of the position on the electrode wires. In this regard, when a voltage higher than 6 kV AC is applied, insulation breakdown becomes more likely to occur, so that the AC voltage is preferably applied in the range of 1 kV to 6 kV also from the perspective of safety.

Example 4

In the same device configuration as in Example 1, the magnitude of the voltage was set to 6 kV per centimeter (cm) of the electrode-distance. As a result, orientation of CNTs in the obtained film was smaller than that at 4 kV. From this, it was found that the AC voltage is desirably applied in the range no more than 6 kV. In the following Examples, embodiments were carried out by adding the previously-mentioned oscillating unit to the so far described Examples. As for the oscillating unit, the embodiments were carried out by periodically reciprocating the previously-mentioned insulating plate 1 and support 3 using the rotating motion of the crank disc 10 shown in FIGS. 2(d) and (e).

Example 5

Comparison Between with and without Oscillation

The comparison was carried out in a device configuration including: a crank disc, a connecting rod, a Mabuchi motor, a DC power source (manufactured by Kenwood Corporation), and a TEMPAX (registered trademark) glass plate with a size of 15 cm square and 0.7 mm thickness as the support 3; in addition to Example 1, as the oscillating unit shown in FIGS. 2(d) and (e). The magnitude of the voltage to be applied was set to 5 kV per centimeter (cm) of the electrode-distance, and the frequency was set to 4 kHz. The insulating film movement distance was set to 0.5 cm, and the repetition time of the movement was set to 30 seconds. FIG. 7(a) shows obtained results. As shown in FIG. 7(a), by carrying out the oscillation, the resistivity decreased up to $10^2$ order.

Example 6

Measurement when the Nanotube Concentration was Changed

The measurement was carried out in a device configuration including: a crank disc, a connecting rod, a Mabuchi motor, a DC power source (manufactured by Kenwood Corporation), and a TEMPAX (registered trademark) glass plate with a size of 15 cm square and 0.7 mm thickness as the support 3; in addition to Example 1, as the oscillating unit shown in FIGS. 2(d) and (e). The magnitude of the voltage applied was set to 5 kV per centimeter (cm) of the electrode-distance, and the frequency was set to 4 kHz. The insulating film movement distance was set to 0.5 cm, and the repetition time of the movement was set to 30 seconds. FIG. 7(b) and FIG. 8(a) show obtained optical microscope images and the resistivity on the respective CNT concentrations of 0.01 wt %, 0.025 wt %, 0.05 wt %, and 0.1 wt %.

FIG. 8(b) shows the local homogeneity as determined by the spatial gray level dependence method (SGLDM). The spatial gray level dependence method (SGLDM) is a widely known method in which texture analysis of an image is carried out using a co-occurrence matrix to calculate the energy, entropy, correlation, local homogeneity, and inertia as the characteristic amount of texture. By the local homogeneity 0 is meant local homogeneity in the orientation direction, while the local homogeneity 90 means local homogeneity in the direction orthogonal to the orientation direction. The larger the difference between the two local homogeneities is, the greater the orientation level is.

According to FIGS. 8(a) and (b), in the CNT nanocomposite film of the present invention, it is indicated that it is possible to achieve high orientation property where the difference in local homogeneity between the orientation direction and the orthogonal direction is 0.2 or more even at a low concentration of 0.05 wt % or less content of nanotubes or nanoparticles in the film.

On the CNT nanocomposite film having 0.05 wt % content of nanotubes or nanoparticles in the film shown in FIGS. 7(c) and (d), the resistivity was further checked. As shown in FIG. 7(e), particularly, in the region A in the figure, low resistivity with a numerical value of $5.8 \times 10^5$ ($\Omega \cdot m$) was detected.

Example 7

Measurement when the Oscillating Speed was Changed

The measurement was carried out in a device configuration including: a crank disc, a connecting rod, a Mabuchi motor, a DC power source (manufactured by Kenwood Corporation), and a TEMPAX (registered trademark) glass plate with a size of 15 cm square and 0.7 mm thickness as the support 3; in addition to Example 1, as the oscillating unit shown in FIGS. 2(d) and (e). A voltage of 5 kV per centimeter (cm) of the electrode-distance was applied at a frequency of 4 kHz. CNT nanocomposite films were produced on the respective oscillating speeds where the numbers of times of reciprocation per 1 minute were 1, 4, and 13 times (rpm). FIG. 9 shows results of the experiment. As shown in FIGS. 9(a) to (c), as the oscillating speed increased, CNTs in the CNT nanocomposite film became homogenized. However, as shown in FIG. 9(d), the dispersibility was markedly lowered when the oscillating speed reached 30 rpm. The oscillating operation is preferably carried out at 4 rpm from the perspective of homogeneity of dispersion and resistivity of carbon nanotubes.

Example 8

Measurement Using Different Polymers

In the above Examples, an ultraviolet curing resin was used for the polymer film. However, since embodiments according to the present invention are not limited to ultraviolet curing resins, the embodiments were carried out using a thermosetting resin.

The measurement was carried out in a device configuration including the previously-mentioned crank disc in addition to Example 1. A thermosetting resin PDMS (polydimethylsiloxane) was used for the polymer film. The respective electrode wires were alternately connected to a power source and a ground. An upper portion of each of the electrode wires was covered with a Parafilm. As a polymer mixed with CNTs, the thermosetting resin PDMS (Sylgard 184; manufactured by Dow Corning Corporation) of 0.05 wt % CNT content, in which the proportion of PDMS to hexane was 3 to 1, was spread out on an upper portion of the electrode plate. A voltage was applied and heat was applied to 70 degrees to facilitate polymerization, whereby polymerization of the polymer started. The voltage application time was set to 20 minutes, and the heating time was set to 60 minutes. A voltage of 5 kV per centimeter (cm) of the electrode-distance was applied at a frequency of 4 kHz. The insulating film movement distance was set to 0.5 cm, and the repetition time of the movement was set to 30 seconds. Texture analysis based on the spatial gray level dependence method (SGLDM) was carried out. The orientation property was approximately ten times enhanced by the voltage application.

Example 9

Measurement of the Thermal Conductivity

According to the device and the method described in the above Example 7, the thermal conductivity of each nanotube or nanoparticle was measured under the following conditions.

(1) Measurement Conditions
Thermal Conductivity Measurement: quick thermal conductivity meter (QTM-500; KEM: Kyoto Electronics Manufacturing Co., Ltd.)
Base Material: ultraviolet curing resin (A-1669; TESK Co., Ltd.)

(2) Subjects of Measurement
1) Multi-walled Carbon Nanotube (636517; Sigma-Aldrich Co. LLC.)
Experiment Conditions: applied electric field: 5 kV/cm, 4 kHz; carbon nanotube concentration, 0.05 wt %
Particle Size: O.D.×I.D.×L=10-30 nm×3-10 nm×1-10 μm
2) Boron Nitride Particle (255475; Sigma-Aldrich Co. LLC.)
Experiment Conditions: applied electric field: 4 kV/cm, 4 kHz; additive concentration: 0.05 wt %
Particle Size: 1 μm
3) Aluminum Oxide (551643; Sigma-Aldrich Co. LLC.)
Experiment Conditions: applied electric field: 3.6 kV/cm, 4 kHz; additive concentration: 0.5 wt %
Particle Size: 2-4 nm×200-400 nm
4) Aluminum Oxide (544833; Sigma-Aldrich Co. LLC.)
Experiment Conditions: applied electric field: 3.6 kV/cm, 4 kHz; additive concentration: 0.5 wt %
Particle Size: <50 nm
5) Silica Dioxide (S5505; Sigma-Aldrich Co. LLC.)
Experiment Conditions: applied electric field: 4 kV/cm, 4 kHz; additive concentration: 0.5 wt %
Particle Size: 14 nm
6) Silica Dioxide (637238; Sigma-Aldrich Co. LLC.)
Experiment Conditions: applied electric field: 4 kV/cm, 4 kHz; additive concentration: 0.5 wt %
Particle Size: 10-20 nm (3) Measurement Results
Results on the thermal conductivity $\lambda$[W/mK] and ratio of thermal conductivity to the ultraviolet curing epoxy resin ($\lambda/\lambda_{epoxy}$) are shown below. Among the above, results on the thermal conductivity ratio ($\lambda/\lambda_{epoxy}$) are shown in a bar graph in FIG. 10(a). From the results of the above, it was found that a film with high thermal conductivity was achieved on the multi-walled carbon nanotube and nanoparticle.

TABLE 1

| Additive Material | Amount Added [wt %] | Thermal Conductivity $\lambda$ [W/mK] | | Thermal Conductivity Ratio ($\lambda/\lambda_{epoxy}$) | |
|---|---|---|---|---|---|
| | | With Electric Field Application | Without Electric Field Application | With Electric Field Application | Without Electric Field Application |
| (Ultraviolet Curing Epoxy Resin) | 0 | 0.1900 | | 1.0000 | |
| Multi-walled Carbon Nanotube | 0.05 | 0.2177 | 0.1966 | 1.1458 | 1.0347 |
| Boron Nitride | 0.05 | 0.2022 | 0.1825 | 1.0642 | 0.9605 |
| Silica Dioxide (14 nm) | 0.5 | 0.2254 | 0.2100 | 1.1863 | 1.1053 |
| Silica Dioxide (10-20 nm) | 0.5 | 0.2229 | 0.2151 | 1.1732 | 1.1321 |
| AluminumOxide(24 nm × 200-400 nm) | 0.5 | 0.2199 | 0.1996 | 1.1574 | 1.0501 |
| AluminumOxide(50 nm) | 0.5 | 0.2145 | 0.1818 | 1.1290 | 0.9568 |

Figure 11:
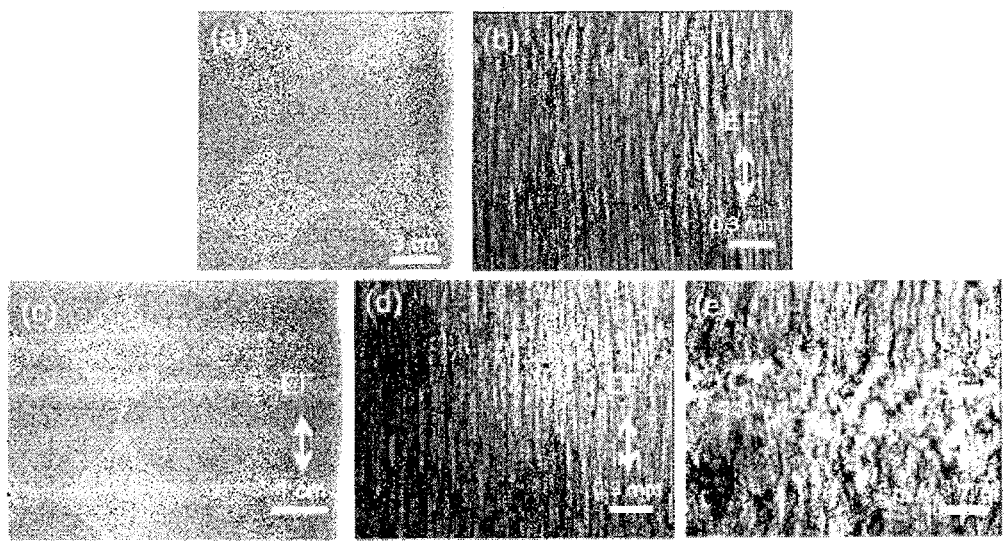
FIG. 11 shows results of an observation with a video microscope, in which a CNT nanocomposite film oriented along the plane direction of the film was produced in accordance with a production method of the present invention.

Further, among the above films, FIG. 11 shows results of an observation in which the inside orientation state of a CNT nanocomposite film obtained with the use of a multi-walled carbon nanotube (MWCNT) was observed using a video microscope (VH-5500; KEYENCE). The composite film was produced with the use of the previously-mentioned 15 cm square TEMPAX (registered trademark) glass plate, whereby the composite film with a nonconventional large area of 15 cm×15 cm was achieved.

FIG. 11(a) is a video microscope observation photograph of the 15 cm×15 cm CNT nanocomposite film obtained with the above method. Although a composite film with a width of only few centimeters at the most could have been produced with the conventional methods using a parallel plate electrode, a homogeneous film with a dramatically increased size without unevenness could be produced by the use of the production method of the present invention. FIG. 11(b) is a microscope image of the produced CNT nanocomposite film where a state of fiber bundles of the multi-walled carbon nanotubes lined up in an electric field direction were observed. It can be conjectured that the fiber bundles of the multi-walled carbon nanotubes were caused by CNTs oriented in the electric field direction, and attracted to each other to be agglutinated in a fibrous state. FIG. 11(c) shows a state of the CNT nanocomposite film when the 15 cm squared TEMPAX (registered trademark) glass plate was not oscillated. In this case, an area on the CNT nanocomposite film corresponding to the position of the electrode wire was whitened. FIGS. 11(d) and (e) are enlarged views of FIG. 11(c). It is clearly recognized that CNTs are homogeneously orientated in FIG. 11(d) showing observation of an area in-between electrode wires, while orientation is not homogeneous in FIG. 11(e) showing enlarged view of an area around an electrode wire. It can be conjectured that the above state was caused by inclination of the electric field having become larger near the electrode wire, whereby CNTs moved along the inclination. From the results of the above, it is indicated that the orientation property along the plane direction of the film can be significantly enhanced by the oscillating operation.

Example 10

Measurement of the Thermal Conductivity

In the above Example 9, the embodiment was carried out using a multi-walled carbon nanotube as the carbon nanotube, where the additive amount of each material (nanotubes or nanoparticles) was 0.5 wt % or less. However, the present invention is not limited to the conditions. Then, in the present Example, the thermal conductivity was measured on a single-walled carbon nanotube from among carbon nanotubes, and on a further increased additive amount of nanoparticle, in accordance with the device and the method described in the above Example 9.

(1) Measurement Condition
Thermal Conductivity Measurement: quick thermal conductivity meter (QTM-500; KEM: Kyoto Electronics Manufacturing Co., Ltd.)
Base Material: ultraviolet curing resin (A-1669; TESK Co., Ltd.)
(2) Subjects of Measurement
  1) Single-walled Carbon Nanotube (704113; Sigma-Aldrich Co. LLC.)
Experiment Conditions: applied electric field: 3.6 kV/cm, 4 kHz; carbon nanotube concentration, 0.05 wt %
Particle Size: O.D.×I.D.×L=10-30 nm×3-10 nm×1-10 μm
  2) Aluminum Oxide (551643; Sigma-Aldrich Co. LLC.)
Experiment Conditions: applied electric field: 3.6 kV/cm, 4 kHz; additive concentration: 5 wt %
Particle Size: 2-4 nm×200-400 nm
  3) Silica Dioxide (637238; Sigma-Aldrich Co. LLC.)
Experiment Conditions: applied electric field: 4 kV/cm, 4 kHz; additive concentration: 5 wt %
Particle Size: 10-20 nm
  (3) Measurement Results
Results on the thermal conductivity $\lambda$[W/mK] and ratio of thermal conductivity ratio to the ultraviolet curing epoxy resin ($\lambda/\lambda_{epoxy}$) are shown below. Among the above, results on the thermal conductivity ratio ($\lambda/\lambda_{epoxy}$) are shown in a bar graph in FIG. 10(b). From the results of the above, it is found that a film with high thermal conductivity was achieved also on the single-walled carbon nanotube and on a further increased additive amount of nanoparticle.

TABLE 2

| Additive Material | Amount Added [wt %] | Thermal Conductivity $\lambda$ [W/mK] | | Thermal Conductivity Ratio ($\lambda/\lambda_{epoxy}$) | |
|---|---|---|---|---|---|
| | | With Electric Field Application | Without Electric Field Application | With Electric Field Application | Without Electric Field Application |
| (Ultraviolet Curing Epoxy Resin) | 0 | | 0.1900 | | 1.0000 |
| Single-walled Carbon Nartotube | 0.05 | 0.2341 | 0.2246 | 1.2321 | 1.1821 |
| Silica Dioxide (10-20 nm) | 5 | 0.2380 | 0.2205 | 1.2526 | 1.1605 |
| AluminumOxide(24 nm × 200-400 nm) | 5 | 0.2499 | 0.2366 | 1.3153 | 1.2453 |

EXPLANATION OF THE SYMBOLS

1 INSULATING PLATE
1a INSULATING PLATE SUPPORTING BODY
2 COMB-LIKE ELECTRODE
3 SUPPORT
4 AC POWER SOURCE
5 POLYMERIZING UNIT
6 CONVEYING UNIT
7 DROPPING UNIT
8 SPREADING UNIT
9 PEELING UNIT
10 CRANK DISC
10a CONNECTING ROD
10b SLIDER
10c SUPPORTING BODY
10d MOTOR
10e MOTOR BASE
10f DC POWER SOURCE
P POLYMER PRECURSOR
Z NANOTUBE
M OSCILLATING DIRECTION

What is claimed is:

1. A method for producing a film containing nanotubes or nanoparticles which are oriented along the plane direction of the film comprising:
   a placing step of placing a film precursor containing nanotubes or nanoparticles on an interdigitated comb-like electrode through a support, in which the comb-like electrode is arranged on an insulating plate and configured with electrode wires having a circular cross-section;
   a voltage applying step of applying an AC voltage to the comb-like electrode in a state with the film precursor present on the comb-like electrode;
   an oscillating step of oscillating at least either one or the other of the insulating plate and the support in a direction orthogonal to a longitudinal direction of the comb-like electrode, and reciprocating the insulating plate or the support over a distance of 0.2 to 1 times the electrode-distance of the comb-like electrode at intervals of 1 to 5 minutes per reciprocation; and
   a film forming step of converting the film precursor into a film.

2. A method for producing a film containing nanotubes or nanoparticles which are oriented along the plane direction of the film, according to claim 1, wherein
   the placing step includes: adding a film precursor dropwise onto the support moving toward the comb-like electrode, and spreading the film precursor on the support to be placed on the comb-like electrode; and
   further includes a peeling step of peeling the nanotube-containing film formed through the film forming step.

3. A method for producing a film containing nanotubes or nanoparticles which are oriented along the plane direction of the film, according to claim 1, wherein the film precursor is a polymer precursor or a sol; and the film forming step includes: converting the film precursor or the sol into a film using a polymerization method or a sol-gel method, respectively.

4. A method for producing a film containing nanotubes or nanoparticles which are oriented along the plane direction of the film, according to claim 1, wherein an AC voltage of 1 kV to 6 kV per centimeter of the electrode-distance in the comb-like electrode is applied.

5. A method for producing a film containing nanotubes or nanoparticles which are oriented along the plane direction of the film, according to claim 4, wherein an AC voltage of 4 kV per centimeter of the electrode-distance of the comb-like electrode is applied.

6. A method for producing a film containing nanotubes or nanoparticles which are oriented along the plane direction of the film, according to claim 1, wherein an AC voltage is applied at a frequency of 1 kHz to 28 kHz.

7. A method for producing a film containing nanotubes or nanoparticles which are oriented along the plane direction of the film, according to claim 6, wherein an AC voltage is applied at a frequency of 4 kHz.

* * * * *